June 10, 1969

W. A. PLICE 3,449,666

IMPEDANCE SENSING CIRCUIT HAVING AMPLIFIER MEANS FOR
MAINTAINING A PAIR OF POINTS AT THE SAME POTENTIAL
Filed Sept. 6, 1966

INVENTOR.
WILLIAM A. PLICE
BY
George Field
ATTORNEY

United States Patent Office 3,449,666
Patented June 10, 1969

3,449,666
IMPEDANCE SENSING CIRCUIT HAVING AMPLI-
FIER MEANS FOR MAINTAINING A PAIR OF
POINTS AT THE SAME POTENTIAL
William A. Plice, Minnetonka, Minn., assignor to
Honeywell Inc., Minneapolis, Minn., a corporation of Delaware
Filed Sept. 6, 1966, Ser. No. 577,517
Int. Cl. G01r 27/14
U.S. Cl. 324—57                           1 Claim

ABSTRACT OF THE DISCLOSURE

An impedance measuring system including a programmable sensing circuit for providing a pair of output voltages for application to a computer from which the reactive and resistance components of an impedance may be determined, said sensing circuit including an A.C. source, an unknown impedance, a standard impedance and input means connected in a closed series loop with an amplifier having its input connectable across the series combination of the source and unknown impedance and its output connectable across said input means for maintaining the ends of the series combination of the input means and the standard impedance at the same potential, whereby a voltage sensing means connectable across said source is functionally connected across said unknown impedance and provides one of said output voltages. The other output voltage is obtained from across said standard impedance.

This invention relates to the field of control apparatus, and more particularly to electrical apparatus for measuring impedances throughout an unprecedentedly wide range of values. While the principle involved is of general utility, it is particularly advantageous in automatic checkout equipment, where many impedance devices or networks in a complex system must be checked, and where the nominal magnitudes and types of the various impedances are known. In such applications a computer program is created by which the various components to be checked are selected for connection to the apparatus in a predetermined order, while for each selection the measuring apparatus is adjusted to accord with the type of impedance, whether resistive, inductive, or capacitive, and the range of the apparatus is set to properly encompass the nominal impedance value.

My invention relates specifically to the circuitry for giving a pair of voltage outputs from which the reactive and resistive components of the impedance being measured may be determined, the circuitry including means programmable in accordance with expected values of impedance to bring the output voltages within predetermined ranges by suitable gain or other adjustments. The computer to which the voltage outputs are supplied, and by which the programming is accomplished, is not a part of my invention.

A principal object of my invention is to provide an improved sensing circuit for giving signals jointly representative of the impedance of a component being measured. Other objects are to provide such a circuit capable of precision measurement over an unprecedentedly wide range of values, which is minimally affected by the characteristics of the output circuit connected thereto and by the presence or absence of ground connections to the component being measured, and to provide such a circuit in which the magnitude of the energizing voltage and of a standard impedance, and the gains of certain output amplifiers, are programmable so that the output voltages fall within predetermined ranges regardless of the type or magnitude of the impedance being measured.

Various other objects, advantages, and features of novelty not individually enumerated above which characterize my invention are pointed out with particularity in the claim annexed hereto and forming a part hereof. However, for a better understanding of the invention, its advantages, and objects attained by its use, reference should be had to the subjoining drawing, which forms a further part hereof, and to the accompanying descriptive matter, in which I have illustrated and described a preferred embodiment of my invention.

Figure 2:
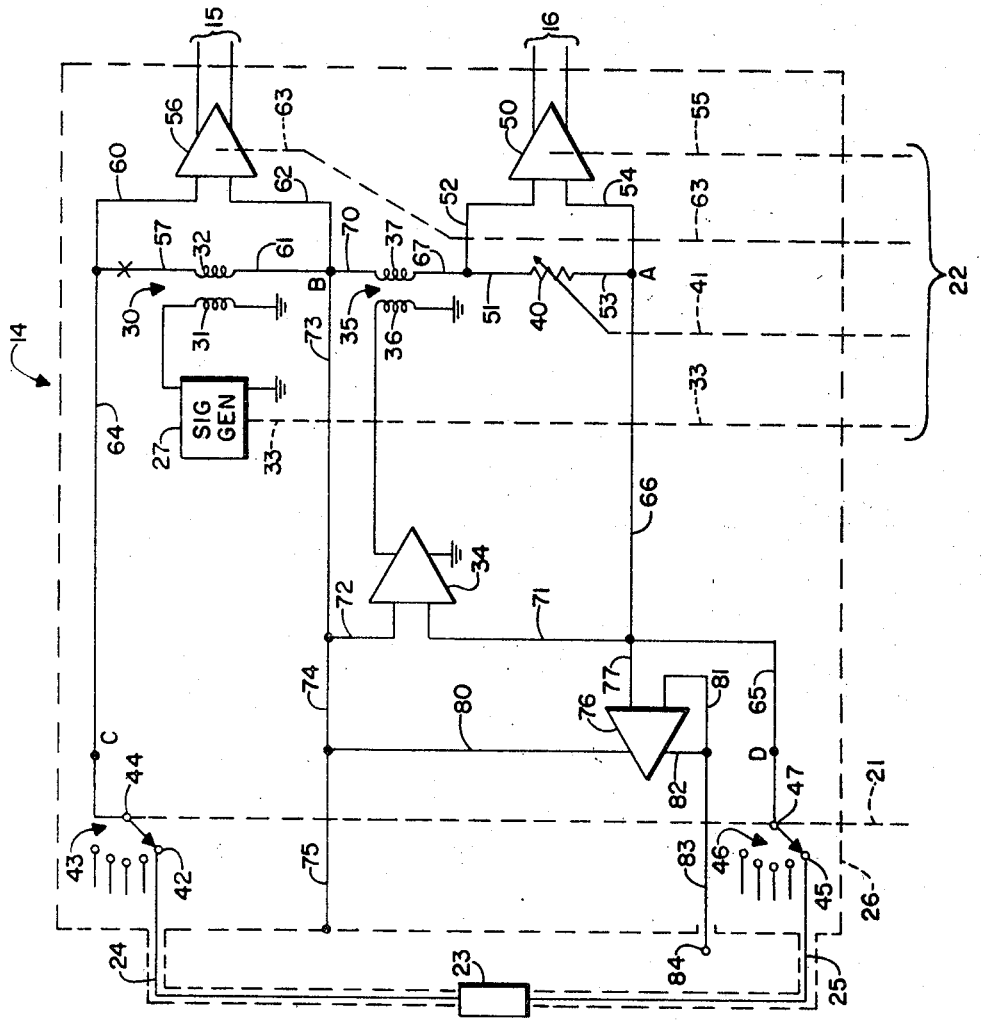
Figure 1:
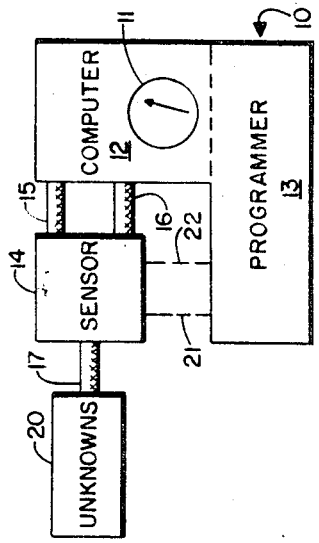

In the drawing FIGURE 1 shows my invention in block diagram, in operative association with a suitable computer, and FIGURE 2 gives details of the structure of the invention.

In FIGURE 1, automatic checkout equipment 10 is shown to comprise an impedance indicator 11, a computer 12, a programmer 13, and a sensor 14 which supplies signals to computer 12 on a pair of cables 15 and 16, and which is connected by a cable 17 to the impedance devices or networks to be measured, shown as unknowns 20. Programmer 13 acts through a first connection 21 to select in sequence the impedances to be measured, and through a second connection 22 to preset the energization and range or sensitivity of the senor: connections 21 and 22 may be either mechanical or electrical.

FIGURE 2 shows sensor 14 in more detail as connected to a particular unknown 23 by a pair of shielded conductors 24 and 25, which form a part of cable 17 of FIGURE 1. The components of sensor 14 are contained in a shielding enclosure 26, to which the shields of the conductors in cable 17 are electrically connected. Sensor 14 includes a signal generator 27 capable of supplying appreciable power through a transformer 30 having a primary winding 31 and a secondary winding 32. An adjustment 33 is provided for setting the output of generator 27 at approximate predetermined values. A differential amplifier 34 having a high common mode impedance energizes the primary winding 36 of a transformer 35 having a secondary winding 37. Amplifier 34 has an extremely high open loop gain. The resistance of a standard resistor 40 may be set to precisely predetermined values by an adjustment 41.

Conductor 24 is connected to one fixed contact 42 of a single pole multiple position switch 43 having a movable contact 44, and conductor 25 is connected to one fixed contact 45 of a second single pole multiple position switch 46 having a movable contact 47. Movable contacts 44 and 47 are actuated simultaneously by connection 21.

A differential amplifier 50 having a high common mode impedance is connected across standard resistor 40 by conductors 51 and 52 and conductors 53 and 54. The gain of amplifier 50 may be set at precisely predetermined values by an adjustment 55, and its input impedance is high compared to the impedance of resistor 40. The output of amplifier 50 appears on cable 16.

A differential amplifier 56 having a high common mode impedance is connected across secondary winding 32 by conductors 57 and 60 and conductors 61 and 62. The gain of amplifier 56 may be set at precisely predetermined values by an adjustment 63. The output of amplifier 56 appears on cable 15.

Members 33, 41, 55, and 63 together make up connection 22.

A series circuit may be traced from secondary winding 32 through conductors 57 and 64, movable contact 44, fixed contact 42, conductor 24, unknown 23, conductor 25, fixed contact 45, movable contact 47, conductors 65, 66, and 53, resistor 40, conductors 51 and 67, secondary winding 37, and conductors 70 and 61 to secondary winding 32.

The input to amplifier 34 is connected to junction point

A between conductors 53 and 54 by conductors 71 and 66, and to the junction point B between conductors 70 and 61 by conductors 72 and 73. Junction point B is connected through conductors 73, 74, and 75 to enclosure 26, which is not grounded.

If it is desirable to provide a DC bias for any particular unknown, such a bias may be connected between a junction point C on conductor 64 and a junction D on conductor 65. If this is done, a blocking capacitor must be inserted at point X in conductor 57.

One input terminal of an amplifier 76 is connected to junction point A through conductors 77 and 66. One output terminal of amplifier 76 is connected to junction point B through conductors 80, 74, and 73. The remaining input and output terminals of amplifier 76 are connected by conductors 81, 82, and 83 to a common return terminal 84 insulated from enclosure 26. If any portion of unkonwn 23 is grounded, terminal 84 is connected to the same ground: amplifier 76 must accordingly be provided with a power supply independent of that for generator 27 and amplifiers 34, 50, and 56, which of course are grounded as is conventional in systems of this sort. If no portion of unknown 23 is grounded, terminal 84 may be connected to the common ground for the remainder of sensor 14.

The purpose of amplifier 34 is to maintain points A and B at the same potential. When this is accomplished, amplifier 56 is functionally connected across unknown 23, and hence measures the voltage across that impedance member, and yet the impedance of amplifier 56 really acts as a load on secondary winding 32 and does not influence the current through the unknown. By reason of the low potential between points A and B, the amplifier and transformer 35 have no influence on the current in resistor 40, which remains equal to that in unknown 23, and the input impedance of amplifier 50 shunted across resistor 40 is so high that its effect is negligible.

Amplifier 76 acts as a low impedance from point B to return terminal 84, for any common mode signals appearing on long leads 24 and 25, while allowing the potential of point B, and hence of A, to float with respect to ground.

For a current $i$ flowing in the series circuit of FIGURE 2 the following relation exists $$e_{32} - iX_{23} - iR_{40} + e_{37} = 0 \quad (1)$$

By reason of the operation of amplifier 34, $$iR_{40} = e_{37} \quad (2)$$

Equation 1 then becomes $$e_{32} - iX_{23} = 0 \quad (3)$$

and $$i = e_{32}/X_{23} \quad (4)$$

In other words, the current in the series circuit is independent of the magnitude of resistor 40 and is determined only by the signal generator output and the unknown impedance.

Equation 4 may be rearranged as follows $$X_{23} = e_{32}/i \quad (5)$$

The quantity $e_{32}$ is supplied at the input to amplifier 56, and if the gain $g_{63}$ of this amplifier is 1, the amplifier output $e_{15}$ has the value $e_{15} = e_{32}$.

The input $e_{50}$ to amplifier 50 is given by the expression $$e_{50} = iR \quad (6)$$

and if the gain $g_{55}$ of amplifier 50 is $1/R$, the amplifier output $e_{16}$ has the value $$e_{16} = \frac{1}{R} e_{50} = i \quad (7)$$

Dividing $e_{15}$ by $e_{16}$ then gives a quotient which is equal to the impedance of unknown 23. If the unknown is reactive, the division must also take into consideration the phase angle between the voltage $e_{32}$ (equals $e_{15}$) across the unknown and the current $i$ (equals $g_{55}e_{15}$) in the unknown. The division and the phase angle determination are determined in computer 12 by known procedures, and the quotient is displayed on indicator 11 which conveniently has a scale reading from 0 to 10. Changes by factors of 10 in the signal generator voltage $e_{32}$, the resistance of resistor 40, and the gains $g_{55}$ and $g_{63}$ make it possible to read the value of the unknown impedance with the same degree of accuracy over a very wide range of values without impressing a dangerously high voltage on unknowns of small impedance or attempting to work with such small values of current in resistor 40 that the accuracy of the apparatus is compromised.

At the same time that programmer 13 operates connections 21 and 22 it also makes any computer modifications necessary when reactive impedance of either type is being measured, and may further give indications of what type the impedance is and of what scale factor is to be used in reading the indicator.

I claim as my invention:

1. Impedance measuring means comprising, in combination:
   a closed series circuit including seriatim the terminals of the secondary winding of an input transformer, of input means adapted to be connected to a component, the impedance of which is to be measured, of a member having a standard impedance, and of the secondary winding of an output transformer;
   a source of alternating voltage connected to the primary winding of said input transformer to energize said series circuit;
   a feedback amplifier connected to energize the primary winding of said output transformer, said amplifier having a high open loop gain; and
   means connecting the input of said amplifier between the terminals of said input transformer and said input means which are not connected together, whereby to maintain the last named terminals at the same potential;
   so that the ratio between the voltage across the first secondary winding and the voltage across said member is a measure of the impedance to be measured.

References Cited

UNITED STATES PATENTS

| | | | |
|---|---|---|---|
| 3,056,082 | 9/1962 | Redding | 324—62 |
| 3,302,106 | 1/1967 | Shaw | 324—62 |
| 3,387,208 | 6/1968 | Foley | 324—60 |

RUDOLPH V. ROLINEC, *Primary Examiner.*

E. E. KUBASIEWICZ, *Assistant Examiner.*

U.S. Cl. X.R.

323—44